US012775475B2

(12) United States Patent
Tanaka et al.

(10) Patent No.: US 12,775,475 B2
(45) Date of Patent: Oct. 27, 2026

(54) PREDICTING INPUT CANDIDATES VIA AN EXTENDED USER INTERFACE

(71) Applicant: NTT, Inc., Tokyo (JP)

(72) Inventors: Hideaki Tanaka, Musashino (JP); Taisuke Wakasugi, Musashino (JP); Masashi Tadokoro, Musashino (JP)

(73) Assignee: NTT, Inc., Tokyo (JP)

( * ) Notice: Subject to any disclaimer, the term of this patent is extended or adjusted under 35 U.S.C. 154(b) by 273 days.

(21) Appl. No.: 18/706,771

(22) PCT Filed: Nov. 16, 2021

(86) PCT No.: PCT/JP2021/042135
§ 371 (c)(1),
(2) Date: May 2, 2024

(87) PCT Pub. No.: WO2023/089675
PCT Pub. Date: May 25, 2023

(65) Prior Publication Data
US 2026/0154092 A1 Jun. 4, 2026

(51) Int. Cl.
*G06F 9/451* (2018.01)

(52) U.S. Cl.
CPC .................................... *G06F 9/451* (2018.02)

(58) Field of Classification Search
CPC ....... G06F 3/0237; G06F 40/174; G06F 40/18
See application file for complete search history.

(56) References Cited

U.S. PATENT DOCUMENTS

| | | | | |
|---|---|---|---|---|
| 7,216,292 B1 * | 5/2007 | Snapper | G06F 40/174 | 715/236 |
| 11,017,163 B2 * | 5/2021 | Wang | G06F 40/174 | |
| 2007/0209015 A1 * | 9/2007 | Ritter | G06F 40/174 | 715/810 |
| 2013/0091411 A1 * | 4/2013 | Rampson | G06F 3/0237 | 715/224 |
| 2015/0039989 A1 * | 2/2015 | Dhanawat | G06F 3/0488 | 715/226 |
| 2015/0363379 A1 * | 12/2015 | Okajima | G06Q 90/00 | 715/220 |
| 2015/0370478 A1 * | 12/2015 | Okajima | G06F 3/04895 | 715/780 |
| 2016/0224217 A1 * | 8/2016 | Kim | G06F 3/0482 | |
| 2019/0197102 A1 * | 6/2019 | Lerner | G06F 3/04817 | |
| 2021/0149692 A1 | 5/2021 | Koya et al. | | |

FOREIGN PATENT DOCUMENTS

| | | |
|---|---|---|
| JP | 2008299744 | 12/2008 |
| JP | 201772872 | 4/2017 |
| WO | WO 2019225621 | 11/2019 |

* cited by examiner

*Primary Examiner* — Asher D Kells
(74) *Attorney, Agent, or Firm* — Fish & Richardson P.C.

(57) ABSTRACT

A display control device extracts data similar to data input by a user from past data stored in a history DB using the results of data input when the user has completed inputting data up to predetermined input items of a Web system. After that, the display control device extracts, as input candidates, the result of data input to the input item corresponding to the input item next to the input item that the user has finished inputting in the extracted data. Also, the display control device sets the extended UI for the input item to display the extracted input candidate as the input candidate for the next input item to be input by the user.

6 Claims, 9 Drawing Sheets

Fig 5

| | TEXT | TEXT | TEXT | DOUBLE | |
|---|---|---|---|---|---|
| | CLASSIFICATION (ITEM 1) | MANUFACTURER (ITEM 2) | PRODUCT NAME (ITEM 3) | PRICE (ITEM 4) | |
| DATA a | BALLPOINT PEN | M COMPANY | OO PEN | 120 | |
| DATA b | BALLPOINT PEN | M COMPANY | XX PEN | 200 | |
| | Similar(a1,b1) | Similar(a2,b2) | Similar(a3,b3) | Similar(a4,b4) | Σ similar/M |
| SIMILARITY | 1 | 1 | 0.5 | 0.7 | 0.8 |

| ID | CLASSIFCATION | MANUFACTURER | PRODUCT NAME | PRICE | SIMILARITY |
|---|---|---|---|---|---|
| 3 | BALLPOINT PEN | M COMPANT | OO PEN | 120 | 0.7 |
| 2 | BALLPOINT PEN | M COMPANT | XX PEN | 200 | 0.7 |
| 1 | BALLPOINT PEN | N COMPANT | YY PEN | 150 | 0.3 |
| 4 | DESK | M COMPANT | OO DESK | 150000 | 0.0 |
| | .. | .. | .. | .. | .. |

PREDICTING INPUT CANDIDATES VIA AN EXTENDED USER INTERFACE

CROSS-REFERENCE TO RELATED APPLICATIONS

This application is a National Stage application under 35 U.S.C. § 371 of International Application No. PCT/JP2021/042135, having an International Filing Date of Nov. 16, 2021, the disclosure of which is considered part of the disclosure of this application, and is incorporated by reference in its entirety into this application.

TECHNICAL FIELD

The present invention relates to a display control device, a display control method, and a display control program.

BACKGROUND ART

In the related art, in order to support a user's operation on a screen of a Web system, apart from a UI (existing UI) provided by the screen of the Web system, there is a technique of preparing an extended UI (extended UI) for supporting user operations and displaying the extended UI overlaid on the existing UI on the screen. For example, there is a technique of supporting a user's operation by overlaying an extended UI indicating a list of information (input candidate list) which is input candidates for the existing UI on the existing UI on the screen. In this technique, when an extended UI overlaid on an existing UI on the screen receives a user's operation, the content of the operation is transferred to the existing UI. Thus, the Web system can process the user's operation as having been performed on the existing UI (refer to PTL 1).

CITATION LIST

Patent Literature

[PTL 1] Japanese Patent Application Publication No. 2017-072872

SUMMARY OF INVENTION

Technical Problem

However, the above technique requires the creator side to prepare in advance the input candidate list used for the extended UI. For this reason, there is a problem that the creation cost is high at the time of introducing the extended UI or at the time of updating the data of the extended UI. Accordingly, an object of the present invention is to reduce costs at the time of introducing an extended UI or at the time of updating data of the extended UI.

Solution to Problem

In order to solve the above-mentioned problems, an input reception part which receives data input from a user of a Web system for each of input items which make up a screen of the web system; a data extraction part which extracts, from a storage part, data having a degree of similarity of a predetermined value or more with a result of data input to each input item by the user on the basis of a data input result when the user completes inputting data up to a predetermined input item and a result of calculating the degree of similarity with the result of data input up to the predetermined input item on the screen of the web system in the past stored in the storage part among the input items on the screen of the Web system; an input candidate extraction part which extracts a result of data input to an input item corresponding to an input item next after an input item in which the user has completed inputting in the extracted data, as an input candidate for a next input item; and an extended UI setting part which displays the extracted input candidate on the extended UI of the next input item are provided.

Advantageous Effects of Invention

According to the present invention, it is possible to reduce costs at the time of introducing an extended UI and at the time of updating data of the extended UI.

BRIEF DESCRIPTION OF DRAWINGS

FIG. 5 is a diagram for explaining an example of a similarity calculation process.

DESCRIPTION OF EMBODIMENTS

Figure 1:
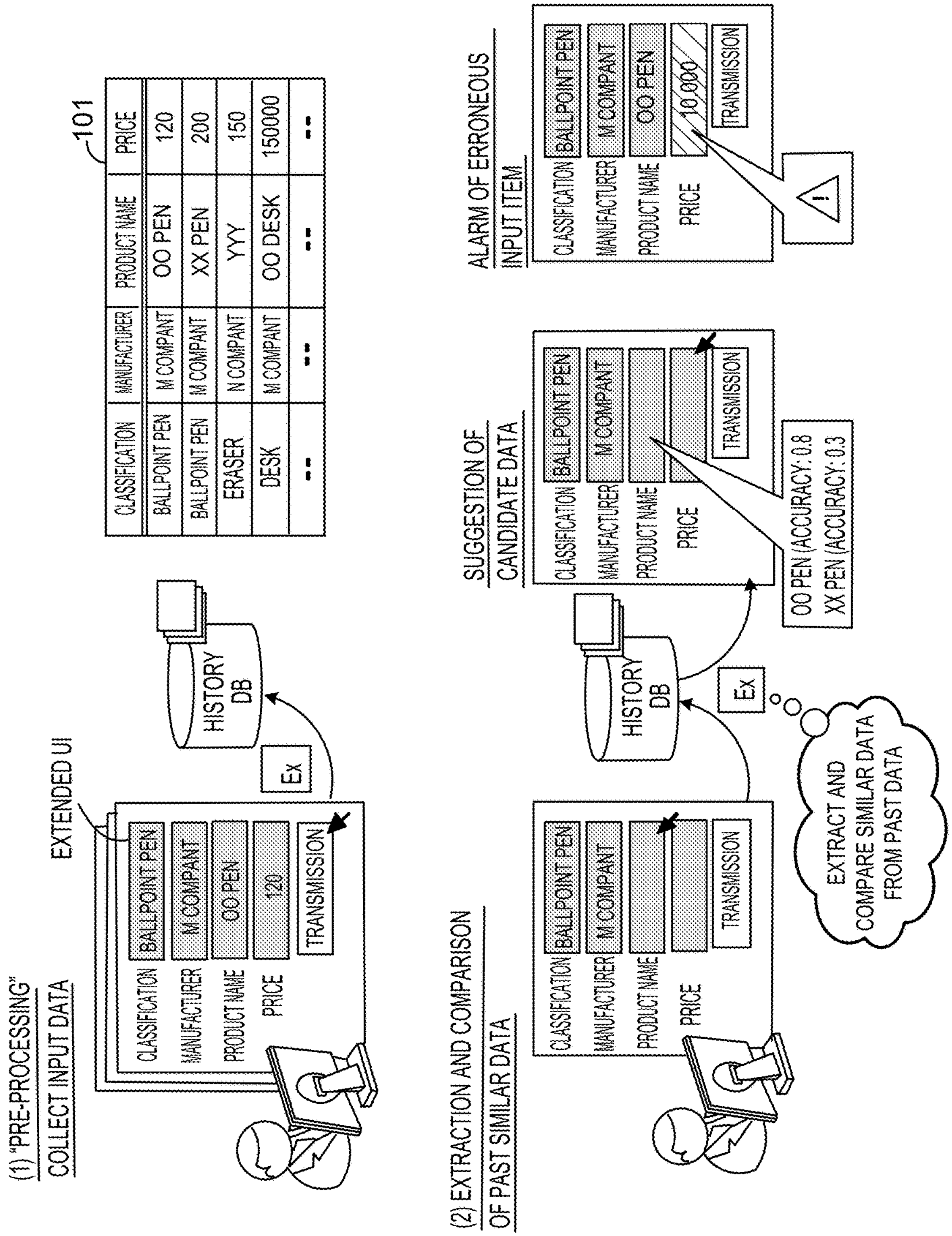
FIG. 1 is a diagram for explaining an overview of a display control device.

Modes (embodiments) for carrying out the present invention will be described below with reference to the drawings. The invention is not limited to this embodiment.

[Extended UI]

An extended user interface (UI) in this embodiment will be briefly described. The extended UI is a UI which is overlaid on the existing UI (original UI provided in the Web system) which constitutes the screen of the Web system to support the operation of the user of the Web system. For example, the extended UI displays user input candidates and the like and accepts selection input (operation input) from the user. Also, the extended UI and the content of the operation input are transferred to the existing UI corresponding to the extended UI. Furthermore, the Web system performs processing on the basis of the content of the operation passed to the existing UI. Thus, the Web system treats the user's operation as having been performed on the existing UI. This extended UI is realized using, for example, the technique described in PTL 1.

Overview

First, an overview of the display control device of the present embodiment will be described with reference to FIG. 1. As a pre-processing, the display control device collects the data which is input, by a user, to each input item which constitutes the screen of the Web system using an extended UI or the like embedded in each input item on the screen and stores it in a history DB (database) ((1) Collection of input data).

After that, if the display control device receives an input up to a predetermined input item on the screen of the Web system, similar data is extracted from the data stored in the history DB and compared ((2) Extraction and comparison of past similar data).

Also, the display control device extracts, from the extracted past similar data, the input result of the data of the input item (for example. "manufacturer") corresponding to the input item (for example. "product name") next after the input item which the user has completed inputting.

After that, the display control device sets the input result (for example, "OO pen", "XX pen", and the like) of the extracted data in the extended UI as an input candidate for the input item (for example, "product name") to be input next by the user. At this time, for example, as shown in FIG. 1, the display control device may also display the accuracy (similarity) of the input candidates for the input item or may display the candidates arranged in descending order of accuracy.

Thus, the display control device eliminates the need for the extended UI designer to prepare input candidates in advance at the time of displaying input candidates for each input item on the screen of the Web system by the extended UI. As a result, it is possible to reduce the burden on the designer of the extended UI when creating the extended UI. Furthermore, since the display control device extracts input candidates for the next input item using the data input result for the input item that the user has already completed inputting, appropriate data can be displayed on the extended UI as input candidates for input items. As a result, the display control device can provide an extended UI that makes it easier for the user to perform input work.

Furthermore, after the user completes an input to each input item on the screen of the Web system, the display control device may display a warning for an input item which may have been erroneously input by comparing it with similar data stored in the history DB.

For example, when the data input result for the "price" input item on the Web system screen shown in FIG. 1 is not similar to the data input result for the "price" input item in the similar data stored in the history DB, the display control device issues a warning to the effect that there is a possibility that the result of inputting data to the input item of "price" is an incorrect input using the extended UI of the input item of "price".

Thus, when there is an input item that the user is likely to input incorrectly, the display control device can display a warning to the effect that the input item may have been erroneously input to the input item using the extended UI. As a result, the display control device can provide an extended UI that makes it easier for the user to perform input work.

Configuration Example

Figure 2:
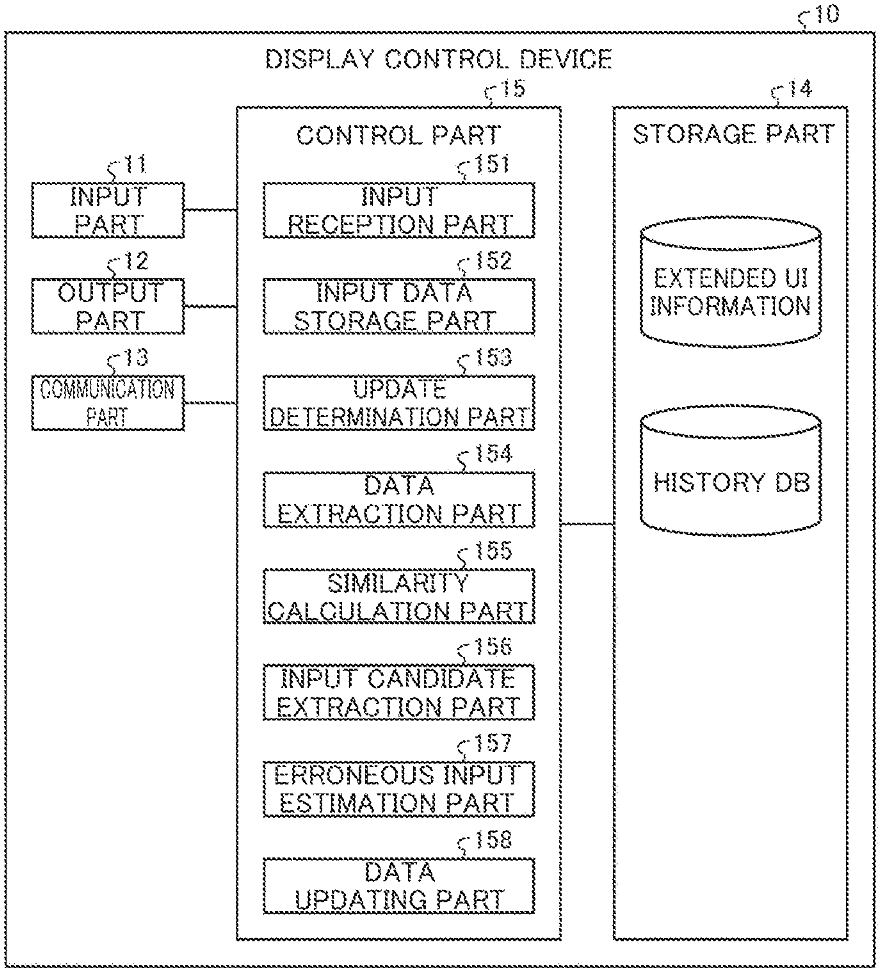
FIG. 2 is a diagram showing a configuration example of the display control device.

A configuration example of the display control device 10 will be described below with reference to FIG. 2. The display control device 10 includes an input part 11, an output part 12, a communication part 13, a storage part 14 and a control part 15.

The input part 11 controls an input of various information to the display control device 10. The input part 11 is, for example, an interface through which an input of various information is received from an input device such as a mouse or keyboard. Also, the output part 12 is an interface for outputting various information to a display device such as a display. The output part 12 outputs, for example, a Web system screen, an extended UI on the screen, and the like to a display. The communication part 13 is a communication interface for performing data communication with other devices via a network.

The storage part 14 stores various information referred to when the control part 15 operates and various information acquired when the control part 15 operates. Here, the storage part 14 is, for example, a random access memory (RAM), a semiconductor memory device such as a flash memory, or a storage device such as a hard disk or an optical disc.

The storage part 14 stores, for example, extended UI information in which extended UI information for each UI (input item) constituting a screen of the Web system is associated with the UI. The extended UI information includes, for example, information indicating the display position of the extended UI corresponding to each input item on the screen of the Web system, the display information of the extended UI, and the input rule (for example, selection input from a pull-down showing input candidates, text input, numeric input, and the like) applied to the extended UI.

Furthermore, the storage part 14 has a history DB. This history DB is a DB in which, for each input item on the screen of the Web system, data which has been input in the input item in the past is stored (refer to reference numeral 101 in FIG. 1).

The control part 15 controls the display control device 10 as a whole. The control part 15 includes an input reception part 151, an input data storage part 152, an update determination part 153, a data extraction part 154, a similarity calculation part 155, an input candidate extraction part 156, an erroneous input estimation part 157, and a data updating part (extended UI setting part) 158.

The input reception part 151 receives data input for each input item on the screen of the Web system via an extended UI corresponding to each input item. Also, the input data storage part 152 stores the data input to each input item on the screen of the Web system in the history DB.

Figure 3:
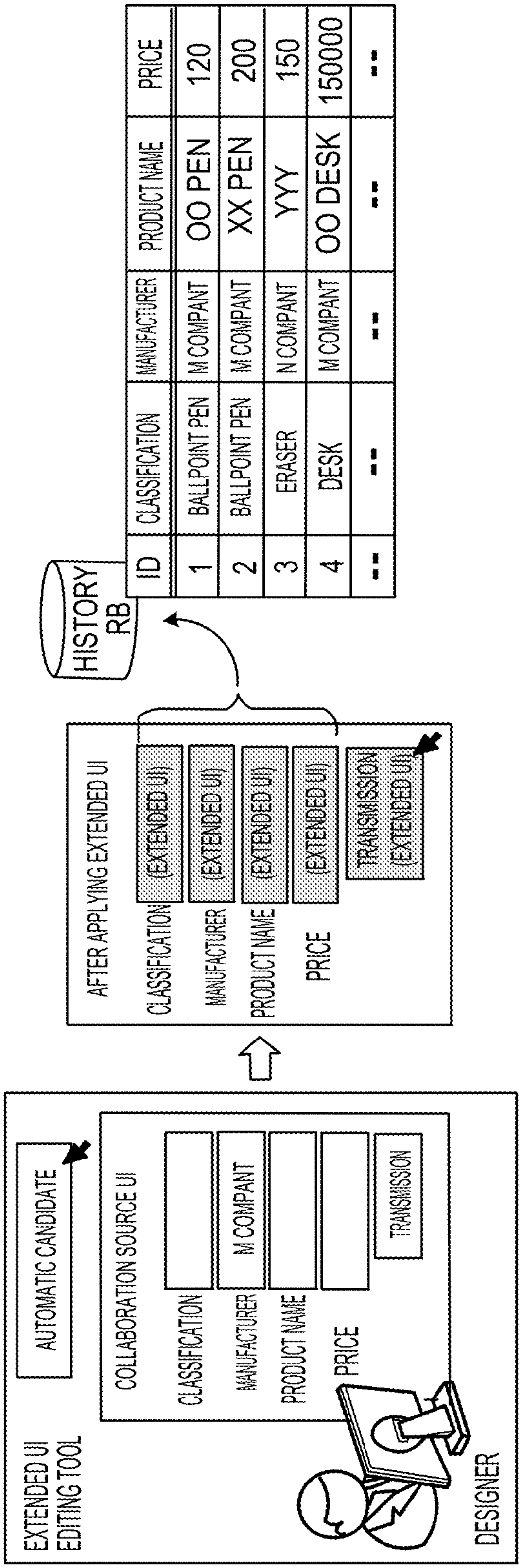
FIG. 3 is a diagram for explaining an example of an input data storage process.

For example, the display control device 10 inserts an extended UI for collecting information input to the linked UI into the collaboration source UI (input item) of the Web system in advance using an extended UI editing tool. For example, as shown in FIG. 3, if an extended UI designer presses a predetermined button of the extended UI editing tool (for example, the automatic candidate UI button), the display control device 10 displays input candidates for input items of the Web system (collaboration source UI) and inserts an extended UI for obtaining input candidates selected from among the displayed input candidates. Also, if the submit button of the Web system is pressed, the display control device 10 inserts an extended UI which stores the data (input candidate selection results) input to each input item in the history DB.

The input data storage part 152 stores, in the history DB, the data input for each input item through the screen of the Web system in which the expanded UI as described above is inserted.

Explanation will be provided with reference to FIG. 2 again. The update determination part 153 determines whether the data input to the input item on the screen of the Web system is the same as the data input to the input item in the past (whether it has been updated). For example, if receiving input data for an input item (for example, "product name" shown in FIG. 4) on the screen of the Web system from the input reception part 151, the update determination part 153 refers to the data in the history DB and determines whether the input data for the input item is the same as the previous input data for the input item.

The data extraction part 154 extracts data similar to the result of data input for each input item received by the input reception part 151 from the history DB.

For example, when the update determination part 153 determines that the input data for the input item on the screen of the Web system (for example, "product name" in FIG. 4) is different from the previous input data for the input item, the data extraction part 154 receives the result of data input of each input item (for example, "classification", "manufacturer" and "product name") from the input reception part 151 up to the input item.

Also, the data extraction part 154 calculates a degree of similarity between the data input result of each input item and the data input result of each input item in the data stored in the history DB of the storage part 14 using the similarity calculation part 155. After that, the data extraction part 154 extracts data having a degree of similarity of a predetermined value or more from the history DB.

Figure 4:
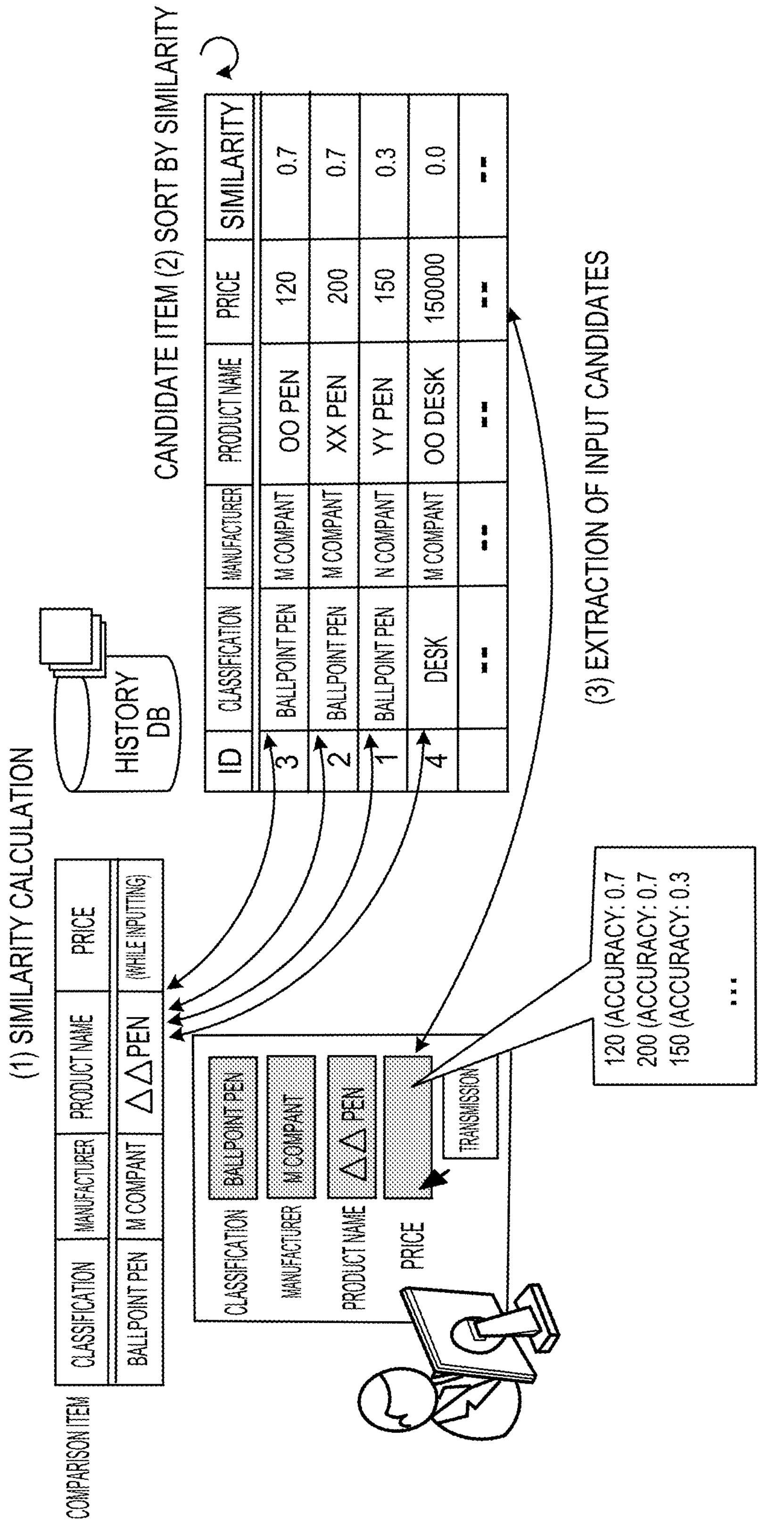
FIG. 4 is a diagram for explaining an example of an input candidate extraction process.

For example, as shown in FIG. 4, the data extraction part 154 compares the result of data input for each of the above input items ("classification", "manufacturer", and "product name") and each of the above input items ("classification") in each piece of data stored in the history DB and calculates the degree of similarity ((1)) using the similarity calculation part 155. Also, the data extraction part 154 extracts data having a degree of similarity of a predetermined value or more from the data stored in the history DB and sorts the extracted data according to the degree of similarity ((2)).

Explanation is provided with reference to FIG. 2 again. The similarity calculation part 155 calculates the similarity between data. For example, the similarity calculation part 155 calculates a distance between data composed of M input items (elements) using the following Expression (1).

[Math. 1]

When two pieces of input data are assumed to be $a = \{a_1, a_2, \ldots, a_M\}$ and $b = \{b_1, b_2, \ldots b_M\}$, Expression (1)

$$S(a, b) = \frac{1}{M}\sum_{m=1}^{M} \text{similar}(a_m, b_m) \text{ is provided.}$$

At this time, similar($a_m$,$b_m$) is set to be a degree of similarity for each input item. similar($a_m$,$b_m$) has a different calculation method depending on the type of $a_m$,$b_m$, and when the input item is of a TEXT type (character string), a standard Rubenshtein distance L(($a_m$, $b_m$) is used (Expression (2)). This standard Rubenshtein distance is a distance measure for character strings which is widely used in spell checking and the like. This standard Rubenshtein distance has a value between 0 and 1 and the higher the similarity, the higher the value. When the data is the same, the value is 1.

[Math. 2]

$$\text{similar}(a_m, b_m) = 1 - L(a_m, b_m) \quad \text{Expression (2)}$$

Also, for example, when the input item (am, bm) is of the DOUBLE type (numerical value), a distance based on a standard Euclidean distance shown in Expression (3) is used in consideration of the dispersion of values. The value of this distance also takes a value between 0 and 1 and the higher the similarity, the larger the value. When the data is the same, the value is 1.

[Math. 3]

$$\text{similar}(a_m, b_m) = 1 - \exp\left(-\frac{(a_m, b_m)^2}{\sigma_m}\right) \quad \text{Expression (3)}$$

$\sigma_m$ is a standard deviation of an $m\,th$ column stored in the history $DB$ , For example, when the similarity calculation part 155 calculates the similarity between data a and data b using the above calculation method, the values shown in FIG. 5 are obtained.

Explanation is provided with reference to FIG. 2 again. The input candidate extraction part 156 extracts input candidates for the next input item to be input by the user from the similar data extracted by data extraction part 154.

For example, as shown in FIG. 4, the input candidate extraction part 156 extracts, as an input candidate for the next input item ("price"), input data ("120", "200", "150", . . . ) relating to the next input item ("price") after the input item ("product name") in which the user has completed inputting of the data extracted by the data extraction part 154 and sorted in descending order of similarity.

Explanation is provided with reference to FIG. 2 again. The erroneous input estimation part 157 uses the data extracted by the data extraction part 154 to estimate input items which may have been erroneously input by the user.

For example, after the user completes data entry for all input items on the Web system screen, the data extraction part 154 extracts, from the data stored in the history DB, data having a degree of similarity of a predetermined value or more with the result of data input to each input item input by the user.

Also, the erroneous input estimation part 157 identifies input items in which the degree of similarity between the data extracted by the data extraction part 154 and the result of data input to each input item is a predetermined value or less, as an input item which may have been erroneously input.

A processing example of the erroneous input estimation part 157 will be described with reference to FIG. 6. Here, a case of estimating an input item which may have been erroneously input will be described, as an example, on the basis of the results of data input to each input item ("classification", "manufacturer", "product name" and "price") on the Web system screen.

In this case, if acquiring the results of data input for each input item ("classification", "manufacturer", "product name" and "price") on the screen of the Web system, the data extraction part 154 uses the similarity calculation part 155 to calculate the similarity with each piece of data stored in the history DB ((1)).

Also, the data extraction part 154 extracts similar data from the history DB on the basis of the degree of similarity calculated in (1) ((2)). For example, the data extraction part 154 extracts data (data indicated by reference numeral 601) having a degree of similarity of a predetermined value or more (for example, 0.7) from the history DB.

Subsequently, the erroneous input estimation part 157 calculates the degree of similarity between the extracted data and the result of data input by the user for each input item ("classification", "manufacturer", "product name" and "price") and calculates the average ((3) calculate the average similarity for each input item).

Figure 6:
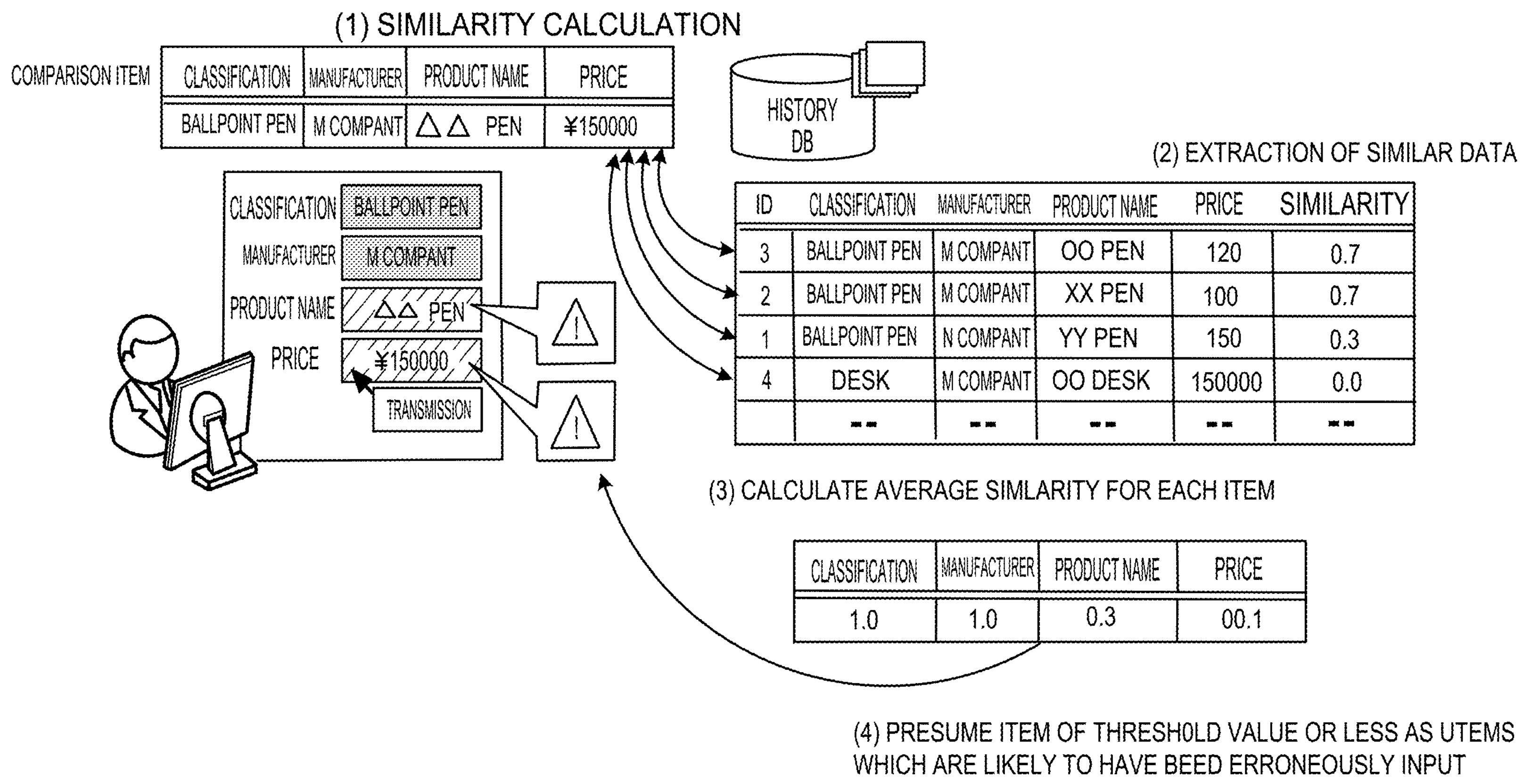
FIG. 6 is a diagram for explaining an example of an erroneous input estimation process.

For example, as shown in FIG. 6, the erroneous input estimation part 157 obtains the data input result ("ballpoint pen") by the user for the input item "classification" and (1) the data input result ("ballpoint pen") of ID "3" extracted from the history DB and (2) the similarity to the data input result ("ballpoint pen") of ID "2" and (3) the similarity to the data input result ("ballpoint pen") of ID "1", and (4) the similarity with the result of data input with ID "4" ("desk"). Also, the erroneous input estimation part 157 calculates the average value ("1.0") of the similarities calculated in (1) to (4). In addition, the erroneous input estimation part 157 calculates the similarity with the result of data input by the user for the input items "manufacturer", "product name", and "price" and calculates the average.

Thus, the erroneous input estimation part 157 obtains, for example, the average similarity "1.0" of the "classification" input item, the average similarity "1.0" of the "manufacturer" input item, the average similarity "0.3" of the input item "product name", and an average value "0.01" of the similarity of "price".

Furthermore, the erroneous input estimation part 157 estimates, among the input items, the input items for which the average value of the calculated similarities is a predetermined threshold or less as the input items which may have been erroneously input ((4)). For example, the erroneous input estimation part 157 estimates an input item ("product name" and "price") with an average similarity value of 0.7 or less as an input item which may have been erroneously input.

Figure 7:
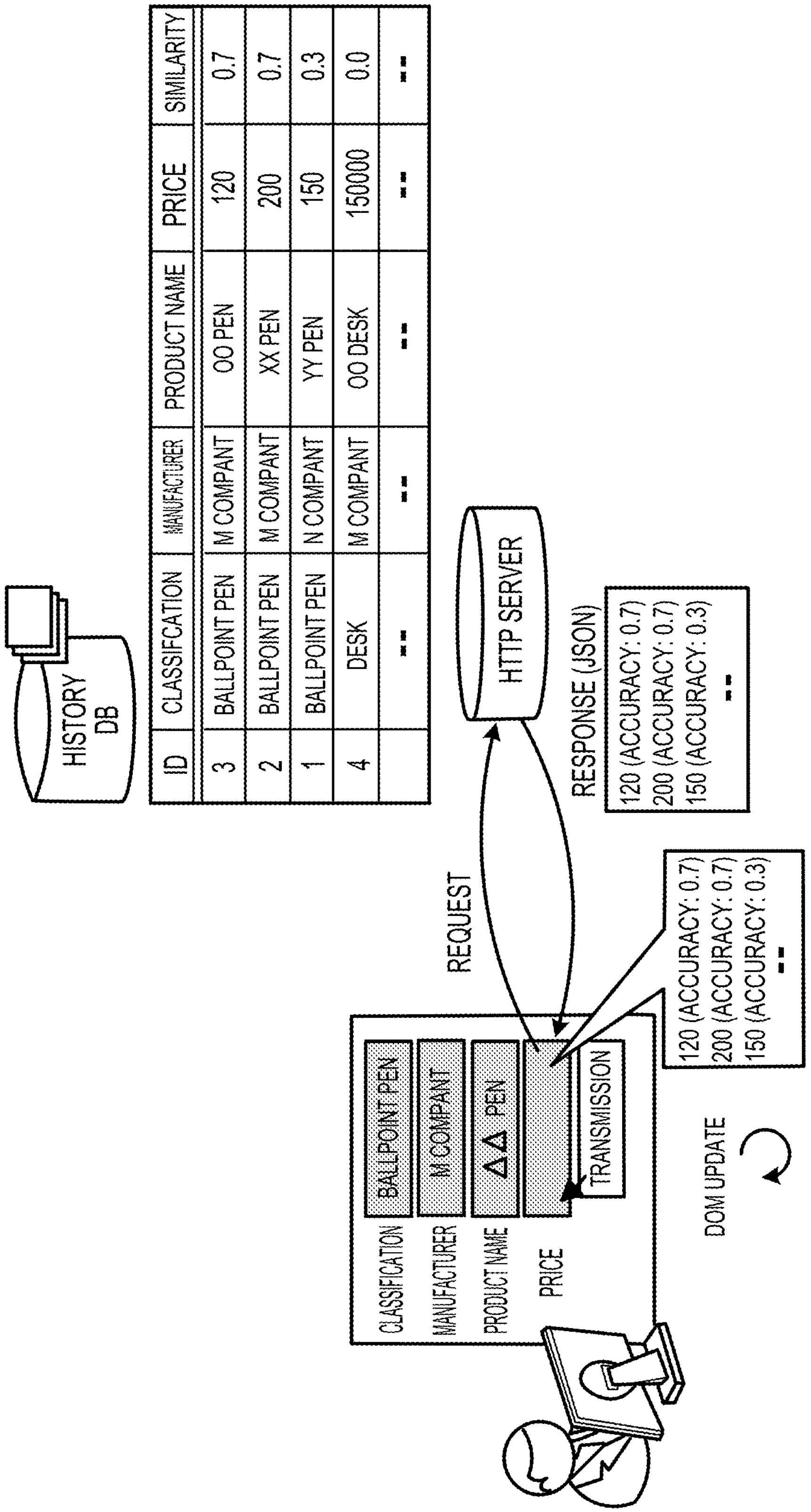
FIG. 7 is a diagram for explaining an example of a data update process.

Explanation is provided with reference to FIG. 2 again. The data updating part 158 updates the extended UI information using the processing results of the input candidate extraction part 156 and the erroneous input estimation part 157. For example, a case in which the input candidate extraction part 156 extracts the input data of the input item "price" from the history DB as input candidates for "price" which is the input item next to "product name" shown in FIG. 7 is considered.

In this case, the data updating part 158 converts the input candidate set in the extended UI for the input item "price" in the extended UI information to the input data for the input item "price" extracted by the input candidate extraction part 156.

Also, for example, the data updating part 158 updates the extended UI display information of the input item which may have been erroneously input by the erroneous input estimation part 157, among the extended UI display information set in the extended UI information.

For example, when the erroneous input estimation part 157 estimates that the input items which may have been erroneously input="product name" and "price", the data updating part 158 sets the display information of the extended UI for the input items "product name" and "price" in the extended UI information to display that there is a possibility of erroneous input.

An implementation example of the data updating part 158 will be described. For example, as shown in FIG. 7, if receiving the input data for each input item on the Web system screen as an HTTP request, the HTTP server extracts similar data from the history DB and extracts input candidates for each input item from the similar data. Furthermore, the HTTP server converts the extracted input candidate into a format such as JSON and transmits it to the data updating part 158 by including it in a response to the request.

The data updating part 158 updates the DOM of the Web system on the basis of the response. For example, the data updating part 158 updates the setting of the extended UI for the next input item (for example, "price") on the screen of the Web system so that the input candidate included in the response is displayed.

Note that, although detailed explanation is omitted herein, if the extended UI is displayed on the existing UI (UI corresponding to the input item) which configures the screen of the Web system, and the extended UI receives the user's operation input, it is assumed that the display control device 10 has a function of passing the content of the operation input to the existing UI corresponding to the extended UI (refer to, for example, PTL 1).

[Example of Processing Procedure]

Figure 8:
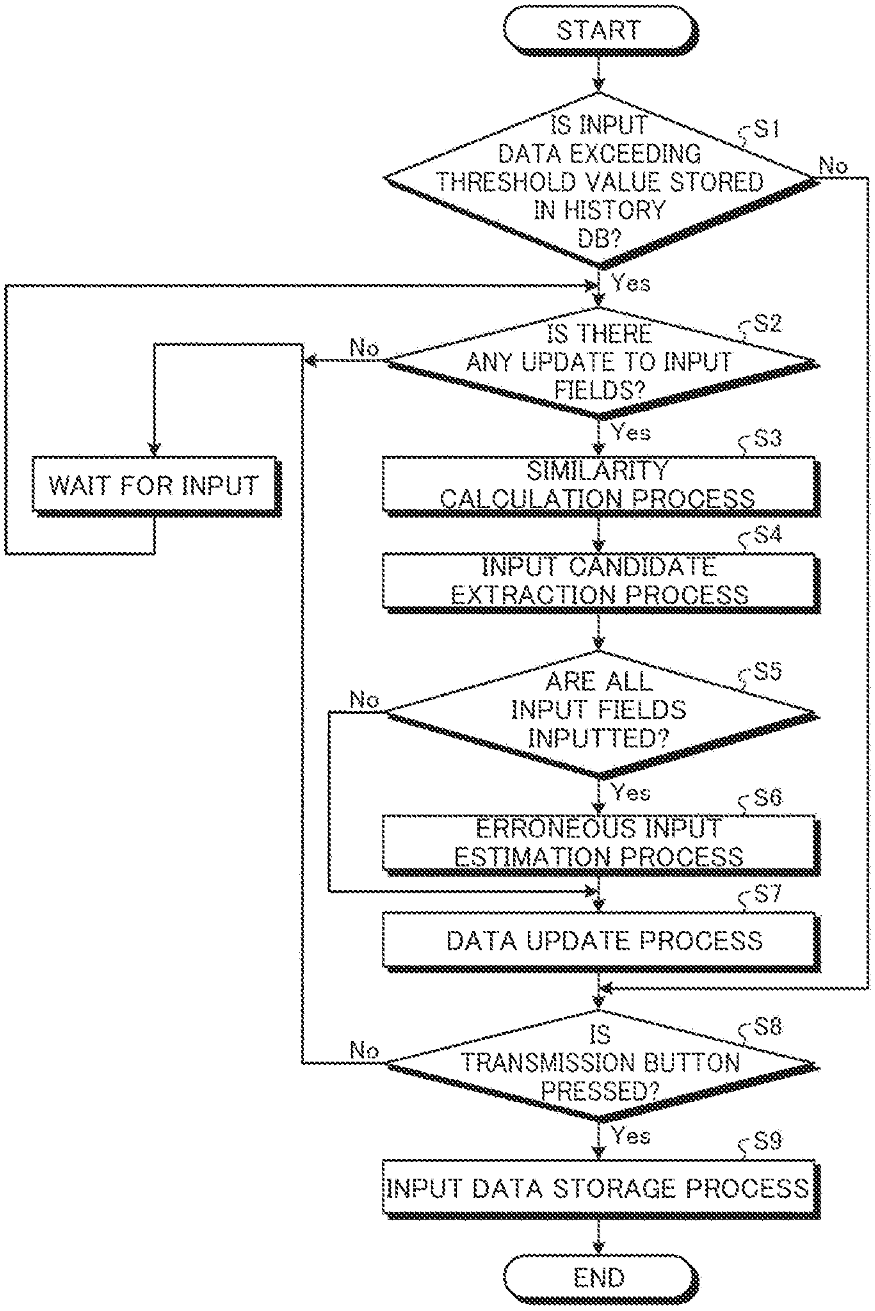
FIG. 8 is a flowchart for describing an example of a processing procedure performed by the display control device.

An example of a processing procedure of the display control device 10 will be described below with reference to FIG. 8. First, when the display control device 10 determines that the input data exceeding a threshold value is stored in the history DB (Yes in S1), the process proceeds to S2. On the other hand, when the display control device 10 determines that the input data exceeding the threshold value has not yet been stored in the history DB (No in S1), the process proceeds to S8.

If the input reception part 151 of the display control device 10 receives input data for input items on the screen of the Web system, the update determination part 153 determines whether the current input data for the input item is different from the previous input data for the input item in the history DB (S2: Has the input item been updated?). If the update determination part 153 determines in S2 that the current input data for the input item is the same as the previous input data for the input item (No in S2), it waits for input from the user.

On the other hand, in S2, when the update determination part 153 determines that the current input data for the input item is different from the previous input data for the input item (Yes in S2), the display control device 10 performs similarity calculation processing (S3). That is to say, the data extraction part 154 obtains, from the input reception part 151, the result of data input from the first input item to the input item input this time among the input items of the Web system. Also, the data extraction part 154 uses the similarity calculation part 155 to calculate the similarity between the data input result up to the input item and the data input result up to the input item in each data stored in the history DB. After that, the data extraction part 154 extracts data whose degree of similarity is a predetermined value or more from the history DB.

After S3, the display control device 10 performs input candidate extraction processing (S4). That is to say, the input candidate extraction part 156 extracts the result of data input to the input item corresponding to the input item next to the input item input by the user in the data extracted by the data extraction part 154, as an input candidate to be displayed on the extended UI for the next input item that the user will input.

After S4, when the display control device 10 determines that the user has already input data for all input items on the screen of the Web system (Yes in S5), the display control device 10 performs erroneous input estimation processing (S6). After that, the process proceeds to S7.

For example, the data extraction part 154 extracts, from the data stored in the history DB, data whose degree of similarity to the result of data input to each input item input by the user is a predetermined value or more. Also, the erroneous input estimation part 157 estimates an input item for which the degree of similarity between the result of data input to the input item by the user and the result of data input to the input item in the data extracted by the data extraction part 154 is a predetermined value or less, as an input item which may have been erroneously input.

On the other hand, when the display control device 10 determines in S5 that there is an input item that has not yet been input among the input items on the screen of the Web system (No in S5), the process skips S6 and proceeds to S7.

The display control device 10 performs data update processing (S7). That is to say, the data updating part 158 updates the extended UI information on the basis of the input candidate extracted in S4 or the information on the input item which may have been erroneously input estimated in S6.

For example, when the input candidate extracted in S4 is the input candidate for input item A, the data updating part 158 updates the input candidates displayed by the extended UI of the input item A in the extended UI information to the input candidates extracted by the input candidate extraction part 156.

Also, when the input item B is estimated as an input item which may have been erroneously input by erroneous input estimation part 157, the data updating part 158 sets the display information of the extended UI of the input item B in the extended UI information to display that there is a possibility that the input item has been erroneously input.

After S7, when the display control device 10 determines that the user has pressed the send button (or input confirmation button) on the screen of the Web system (Yes in S8), it performs input data storage processing (S9). That is to say, the input data storage part 152 stores the input data for each input item on the screen of the Web system in the history DB. On the other hand, when the display control device 10 determines that the user has not yet pressed the send button (or input confirmation button) on the screen of the Web system (No in S8), it waits for an input from the user.

When the display control device 10 performs the above processing, it is possible to update input candidates for each input item displayed by the extended UI and display warnings for input items which may have been erroneously input on the extended UI on the basis of the result of input to the Web system screen from the user. Thus, it is possible to reduce the cost when introducing the extended UI and when updating the data of the extended UI.

[System Configuration and the Like]

Also, each constituent element of each part shown in the drawing is functionally conceptual and does not necessarily need to be physically configured as shown in the drawing. That is to say, the specific form of distribution and integration of each device is not limited to the one shown in the figure, and all or part of them can be functionally or physically distributed and integrated in arbitrary units according to various loads and usage conditions. Furthermore, all or any part of each processing function performed by each device can be implemented by a CPU and a program executed by the CPU, or implemented as hardware based on wired logic.

Also, among the processes described in the above embodiments, all or a part of the processes described as being performed automatically may also be performed manually or all or a part of the processes described as being performed manually may be performed automatically by known methods. In addition, information including processing procedures, control procedures, specific names, and various data and parameters shown in the above documents and drawings can be arbitrarily changed unless otherwise specified.

[Program]

The display control device 10 described above can be implemented by installing a program (display control program) as package software or online software in a desired computer. For example, the information processing device can function as the display control device 10 by causing the information processing device to execute the above program. The information processing device mentioned herein includes mobile communication terminals such as smart phones, mobile phones and personal handyphone systems (PHS) and terminals such as personal digital assistants (PDAs).

Figure 9:
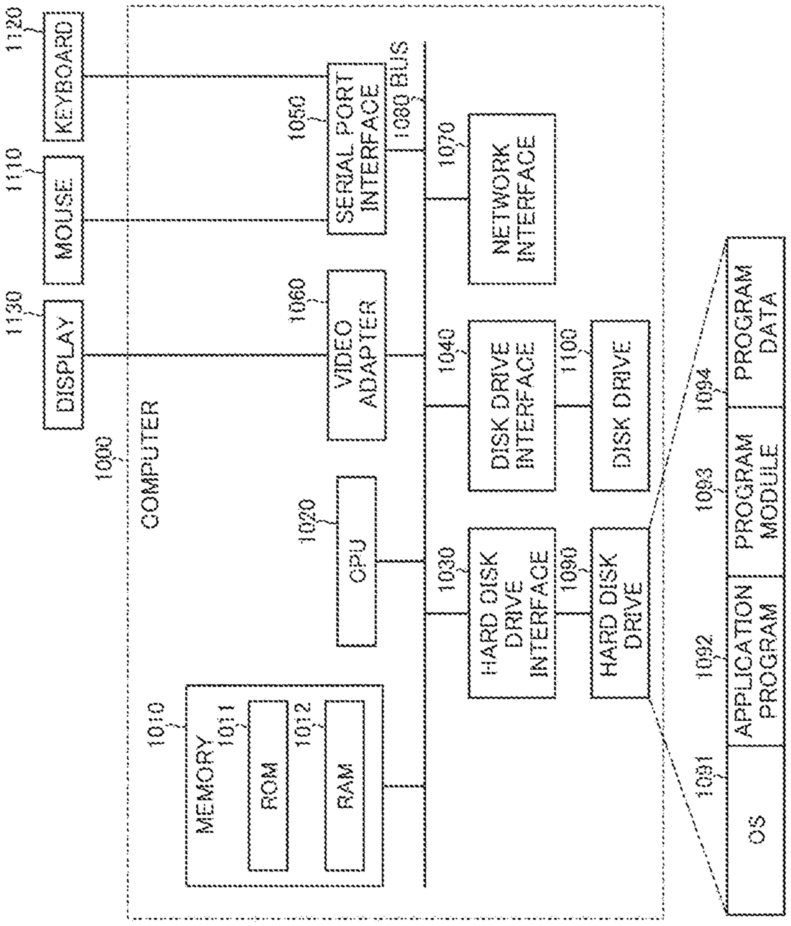
FIG. 9 is a diagram illustrating an example of a computer which executes a display control program.

FIG. 9 is a diagram showing an example of a computer which executes a display control program. A computer 1000 includes, for example, a memory 1010 and a CPU 1020. Furthermore, the computer 1000 has a hard disk drive interface 1030, a disk drive interface 1040, a serial port interface 1050, a video adapter 1060, and a network interface 1070. These parts are connected through a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is to say, a program which defines each type of processing performed by the above-described display control device 10 is implemented as the program module 1093 in which a computer-executable code is described. The program module 1093 is stored in, e.g., the hard disk drive 1090. For example, the hard disk drive 1090 stores a program module 1093 for executing processing similar to the functional configuration of the display control device 10. Note that the hard disk drive 1090 may be replaced with a solid state drive (SSD).

In addition, data used in the processes of the above-described embodiments are stored as program data 1094 in, for example, the memory 1010 or the hard disk drive 1090. Also, the CPU 1020 reads the program module 1093 and the program data 1094 stored in the memory 1010 and the hard disk drive 1090 to the RAM 1012 as necessary and executes them.

Note that the program module 1093 and the program data 1094 are not limited to being stored in the hard disk drive 1090, but may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Also, the program module 1093 and the program data 1094 may be read by the CPU 1020 through the network interface 1070 from other computers.

REFERENCE SIGNS LIST

10 Display control device
11 Input part

12 Output part
13 Communication part
14 Storage part
15 Control part
151 Input reception part
152 Input data storage part
153 Update determination part
154 Data extraction part
155 Similarity calculation part
156 Input candidate point extraction part
157 Erroneous input estimation part
158 Data updating part

The invention claimed is:

1. A display control device, comprising:

an input reception part, comprising one or more processors, configured to receive data input from a user of a web system for each of input items which make up a screen of the web system;

a data extraction part, comprising one or more processors, configured to extract, from a storage part, past screen data by: (i) calculating a degree of similarity between a current data input result, accumulated from a first input item up to a predetermined input item on the screen, and historical data input results accumulated up to the same predetermined input item across past user sessions stored in the storage part; and (ii) selecting the past screen data where the calculated degree of similarity meets or exceeds a predetermined threshold value;

an input candidate extraction part, comprising one or more processors, configured to identify, from the past screen data extracted by the data extraction part, a data value recorded in an input item sequentially after the predetermined input item across the past user sessions, and provide the data value as an input candidate for a next input item to be input by the user; and an extended user interface (UI) setting part, comprising one or more processors, configured to display the input candidate for the next input item on an extended UI overlaid on an existing UI for a user selection, and transfer the selected input candidate from the extended UI to the existing UI.

2. The display control device according to claim 1, wherein the data extraction part is configured to extract the past screen data after the user completes data input to all input items on the screen of the web system, by calculating the degree of similarity across all input items between the completed data input result of the user and the historical data input results stored in the storage part, the display control device further includes:

an erroneous input estimation part, comprising one or more processors, configured to: (i) identify individual input items where a degree of similarity between the data input by the user for the next input item and the corresponding historical data result in the extracted past screen data falls to or below an error threshold value, and (ii) designate the identified individual input items as possibly erroneously input items, and the extended UI setting part is further configured to update a display configuration of the extended UI overlaid on the possibly erroneously input items, in order to visually display an alert indicating a possibility of erroneous input.

3. The display control device according to claim 1, wherein the extended UI setting part is configured to, when a plurality of input candidates are identified by the input candidate extraction part, display the plurality of input candidates on the extended UI in a descending order based on the calculated degree of similarity.

4. The display control device according to claim 1, further comprising:

an input data storage part which is configured to collect the data input from the user of the web system for each of the input items via the extended UI on each respective input item, and store the collected data input in the storage part as the historical data input results.

5. A display control method performed using a display control device, comprising:

receiving data input from a user of a web system for input items constituting a screen of the web system;

extracting, from a storage part, past screen data by: (i) calculating a degree of similarity between a current data input result, accumulated from a first input item up to a predetermined input item on the screen, and historical data input results accumulated up to the same predetermined input item across past user sessions stored in the storage part; and (ii) selecting the past screen data where the calculated degree of similarity meets or exceeds a predetermined threshold value;

identifying, from the extracted past screen data, a data value recorded in an input item sequentially after the predetermined input item across the past user sessions, and provide the data value as an input candidate for a next input item to be input by the user;

displaying the input candidate for the next input item on an extended user interface (UI) overlaid on an existing UI for a user selection; and transferring the selected input candidate from the extended UI to the existing UI.

6. A non-transitory computer readable medium storing a program, wherein execution of the program causes a computer to perform operations comprising:

receiving data input from a user of a web system for each of input items which make up a screen of the web system;

extracting, from a storage part, past screen data by: (i) calculating a degree of similarity between a current data input result, accumulated from a first input item up to a predetermined input item on the screen, and historical data input results accumulated up to the same predetermined input item across past user sessions stored in the storage part; and (ii) selecting the past screen data where the calculated degree of similarity meets or exceeds a predetermined threshold value;

identifying, from the extracted past screen data, a data value recorded in an input item sequentially after the predetermined input item across the past user sessions, and provide the data value as an input candidate for a next input item to be input by the user, as an input candidate for a next input item;

displaying the input candidate for the next input item on an extended user interface (UI) overlaid on an existing UI for a user selection; and transferring the selected input candidate from the extended UI to the existing UI.

* * * * *